Dec. 30, 1930. A. C. WOOD 1,786,471
VEHICLE SERVICE TRAY
Filed March 31, 1927
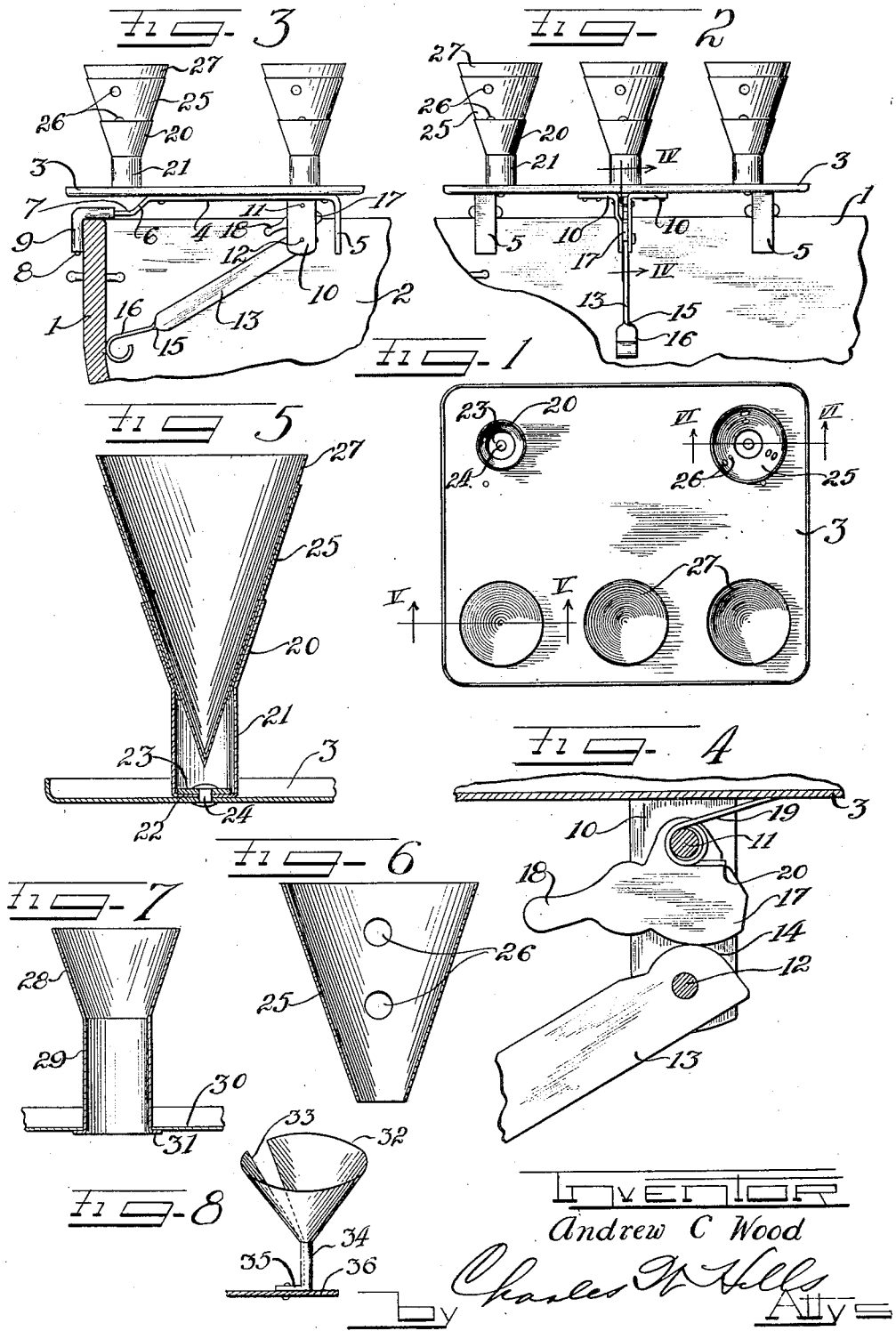

Patented Dec. 30, 1930

1,786,471

UNITED STATES PATENT OFFICE

ANDREW C. WOOD, OF CHICAGO, ILLINOIS, ASSIGNOR, BY MESNE ASSIGNMENTS, TO VORTEX CUP COMPANY, OF CHICAGO, ILLINOIS, A CORPORATION OF DELAWARE

VEHICLE SERVICE TRAY

Application filed March 31, 1927. Serial No. 179,819.

This invention relates to a portable service or serving tray and one particularly designed for convenient attachment and use on vehicles and the like to afford a convenient flat support to be used as a table or tray upon which refreshments may be served including drinks carried in sanitary cups adapted to be seated in auxiliary holders which in turn are adapted to be removably engaged in primary holders secured in spaced relation on the tray.

It is an object of this invention to provide a vehicle service tray having suitable means mounted on the bottom thereof for supporting the tray on a flat support or on a vertical support and, furthermore, having holders secured on the upper face thereof adapted to removably receive auxiliary holders in which liquid containers are adapted to be conveniently supported.

It is also an object of this invention to provide a portable vehicle service tray having coacting holders for liquid containers supported on one side thereof and, furthermore, having a cam controlled brace supported therebeneath to afford a convenient means for supporting the tray on the door or wall of a motor vehicle or the like.

It is another object of this invention to provide a vehicle service tray wherein conical metal holders are rigidly secured in spaced relation on the tray to receive apertured auxiliary conical holders which are used to carry liquid or ice cream containers and reinforce said containers during the time that they are being filled as well as during the time the same are being used.

It is an important object of this invention to provide an improved vehicle service tray adapted to be conveniently supported on the door or wall of a vehicle and having means secured thereto for receiving and conveniently supporting auxiliary holders for cups and the like in which liquids, ice cream, or other foods and drinks may be served.

Other and further important objects of this invention will be apparent from the disclosures in the specification and the accompanying drawings.

This invention (in a preferred form) is illustrated in the drawings and hereinafter more fully described.

On the drawings:

Figure 1 is a top plan view of an improved vehicle service tray embodying the principles of this invention.

Figure 2 is a front elevation of the tray showing the same supported in position on the wall of a vehicle or the like.

Figure 3 is a side elevation of the service tray showing a fragmentary sectional portion of the vehicle on which the tray is supported.

Figure 4 is an enlarged fragmentary detail section of the cam supporting mechanism for the tray taken on line IV—IV of Figure 2.

Figure 5 is an enlarged vertical section taken on line V—V of Figure 1.

Figure 6 is a vertical section through one of the auxiliary holders taken on line VI—VI of Figure 1.

Figure 7 is a vertical section through a modified form of one of the stationary holders.

Figure 8 is a perspective view of another modified form of a primary cup holder.

As shown on the drawings:

The reference numeral 1 indicates a door of a vehicle 2 a fragmentary portion of which is illustrated in Figure 3. The improved service tray for use on motor vehicles and the like comprises a flanged tray 3 constructed of metal or any other suitable material and having rigidly secured in parallel spaced relation transversely across the under face thereof a pair of metal brace bars 4, one end of each of which is bent downwardly at right angles to afford a supporting leg 5 while the other end of each of the bars 4 is bent downwardly at 6 to afford a spring arm 7 the end of which is bent downwardly at right angles to afford a clamping leg 8. Removably engaged over each of the clamping legs 8 and its respective arm 7 is a pad or sleeve 9 constructed of rubber or any other suitable cushioning material to prevent injury to the finish of the doors or walls of a vehicle on which the service tray is adapted to be engaged.

Also secured by rivets or other suitable means to the under face of the tray 3 near the middle portion of one side thereof are a pair of angle brackets 10, the two projecting arms of which are positioned opposite one another in spaced relation and support an upper pin 11 and a lower pin 12. Pivotally mounted on the lower pin 12 is an adjustable supporting or brace arm 13 the pivoted end of which is formed with a cam portion 14. The opposite end of the supporting arm 13 is twisted at 15 to afford a foot or head 16 the end of which is curled or rolled to afford a suitable bearing for engagement with the door or wall of a vehicle when the tray is in position for use. Pivotally supported on the upper pin 11 in coacting relation with the brace arm cam 14 is a control or latch cam 17 provided with a release handle or lever 18. Engaged around the upper or main pin 11 is a control spring 19 one end of which is engaged in a notch 20 (Figure 4) of the control cam 17 while the other end of the spring is positioned to engage against the under face of the tray 3.

Rigidly secured in spaced relation upon the upper surface of the tray 3 are a plurality of main receptacle holders constructed of metal or other suitable material and each comprising an upper conical section 20 supported upon a lower cylindrical section 21 the lower end of which is provided with an inwardly directed flange or apertured closure wall 22 against the inner face of which an apertured washer 23 is seated. Projecting through the washer 23 and the bottom flange or wall 22 of each primary or main holder is a rivet 24 or other suitable retaining means which also projects through an aperture in the tray 3 for rigidly holding the primary holder secured in place.

Each tray is provided with a plurality of auxiliary or secondary cup or container holders each of which comprises a conical or frustum shaped body 25 constructed of metal or other suitable material and having a plurality of apertures 26 therein. The auxiliary holders are open at both ends and are adapted to be removably seated in the upper conical portions 20 of the main holders which are secured to the tray. The auxiliary holders 25 are adapted to be removably seated in the main holders 20—21 carrying conical containers or cups 27 made of paper or other suitable material in which liquid drinks, ice cream, or other suitable refreshments are adapted to be conveniently served. The lower ends of the conical cups 27 project through the apertured auxiliary holders 25 and into the chamber provided within the cylindrical base section 21 of the main holders to protect the lower ends of the paper containers.

Figure 7 illustrates a modified form of a main holder comprising an upper frustum shaped or conical section 28 made of metal or any other suitable material and supported on a lower cylindrical base section 29 which projects through an opening in a flanged tray 30. The lower projecting end of the cylindrical base section is bent outwardly to afford a flange 31 which is rigidly secured against the under face of the tray 30 by spot welding, soldering, or other suitable means.

The improved service tray is normally adapted to be supported by the legs 5 and 8 upon a counter or any suitable support. When an order for refreshments is given the order may be filled by first engaging conical paper cups or containers 27 in the auxiliary apertured metal holders 25 which serve as a convenient means for holding the paper cups and reinforcing the same during the time that said cups are being filled. After the cups are filled the auxiliary containers holding said cups are adapted to be removably seated in the upper conical portions 20 of the primary or main holders secured to the tray 3. After the order is filled and placed on the tray the tray may be lifted and conveniently carried to a waiting vehicle to permit serving of the occupants of the car. To make this service more convenient and complete the angled legs 7—8 of the tray are engaged or seated upon the upper edge of a door or wall of the automobile, as illustrated in Figure 3, with the rubber sleeves 9 acting as guards to protect the car. The legs 8 may be placed either on the inside or outside of the door 1 depending upon whether it is desired to support the tray on the exterior of the car or on the inside thereof. As shown in Figures 3 the tray is placed in position to project into the car and the finger piece or lever 18 is depressed to move the control cam 17 into a released position, permitting the supporting arm or bracket 13 to be swung downwardly away from the tray until the tray is seated in the position desired. The supporting bracket 13 is then swung upwardly toward the tray and into engagement with the inner wall of the door or wall to hold the tray rigidly braced in position for service. With the release of the finger piece or lever 18 the spring 19 holds the control cam 17 in locking frictional engagement with the cam 14 formed on the pivoted end of the supporting arm 13 so that the tray cannot be accidentally released or upset. The coacting cams 14 and 17 permit the supporting arm 13 to be swung upwardly toward the bottom of the tray and into engagement with the supporting wall, but positively lock with one another to prevent the supporting arm to be pulled downwardly away from the wall or away from the tray. After the service tray has served its purpose the same may be readily removed from engagement with the door or wall of an automobile by simply swinging the finger piece or arm 18 of the control cam 17 toward the brace arm 13 to compress the control spring 19 and move the main control cam 17 out of latching engagement with the cam 14 so that the supporting arm 13 may be swung downwardly out of bracing position permitting the tray to be lifted off of the door or other support on which the same has been engaged.

Figure 8 illustrates another modified from of primary holder adapted to be formed from a single sheet of metal and comprising a conical body section 32 provided with a segment shaped outlet slot or opening 33 to permit escape of liquid from the holder. Integrally formed on the lower end of the split conical holder section 32 is a stem or pedestal 34 the lower end of which is bent at an angle to afford a base or foot 35 which is riveted or otherwise rigidly secured upon the upper face of a tray 36, a fragmentary portion only of which is illustrated. The modified holder is adapted to removably receive an auxiliary holder 25 of the type similar to that illustrated in Figure 6 in which a paper cup or container is adapted to be removably seated for holding a liquid or other refreshment which is to be served. The opening 33 in the conical holder section 32 is provided for the purpose of permitting the holder section to be readily drained and cleaned in case liquids or ice cream happen to drop into the holder.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

1. A vehicle service device comprising a tray, container holders mounted thereon, a supporting member having one end pivotally mounted on said tray, a cam formed on the pivoted end of said supporting member, a control cam pivotally mounted on said tray and coacting with said supporting member cam, a spring coacting with said control cam to hold the same in latching engagement with said supporting member cam, and an extension on said control cam for releasing the same to permit release of said supporting member.

2. The combination with a vehicle service tray, a brace arm pivotally mounted thereon, cams at the pivoted end of said arm for locking said brace arm in a bracing position, and a lever extension on one of the cams for releasing said cams to permit release of said brace arm.

3. A vehicle service device comprising a tray, spring legs secured thereto adapted to be engaged on a portion of a vehicle, auxiliary legs on said tray coacting with said spring legs to normally support the tray, a brace bar pivotally mounted beneath said tray, adapted to be engaged with a portion of said vehicle to hold the tray supported in position, cam means coacting with said brace bar for holding the same in a braced position, and a spring coacting with said cam means to hold the same in a locked position.

4. A vehicle service device comprising a tray, means thereon adapted to be seated on a portion of a vehicle, a brace arm pivotally mounted on said tray, a cam formed on the pivoted end of said brace arm, and a spring controlled cam mounted below said tray coacting with said brace arm cam to hold the same in a braced position coacting with a portion of the vehicle to hold the tray in a braced position for use.

5. A vehicle service device comprising a tray, spring members formed theron adapted to be engaged on a portion of a vehicle, a brace arm pivoted on said tray, a spring controlled cam coacting with said brace arm and a finger piece connected with said cam to permit release of the same.

6. A vehicle service device comprising a tray, a supporting member pivotally mounted on said tray, a cam formed on one end of said supporting member, a control cam pivotally mounted on said tray and coacting with said supporting member cam, a spring coacting with said control cam to hold the same in latching engagement with said supporting member cam, and an extension integrally formed on said control cam for releasing the same to permit release of said supporting member.

In testimony whereof I have hereunto subscribed my name at Chicago, Cook County, Illinois.

ANDREW C. WOOD.